Sept. 22, 1959     S. H. NORTON     2,904,874
METHOD OF MANUFACTURING CONNECTING ROD BEARINGS
Filed Nov. 20, 1956
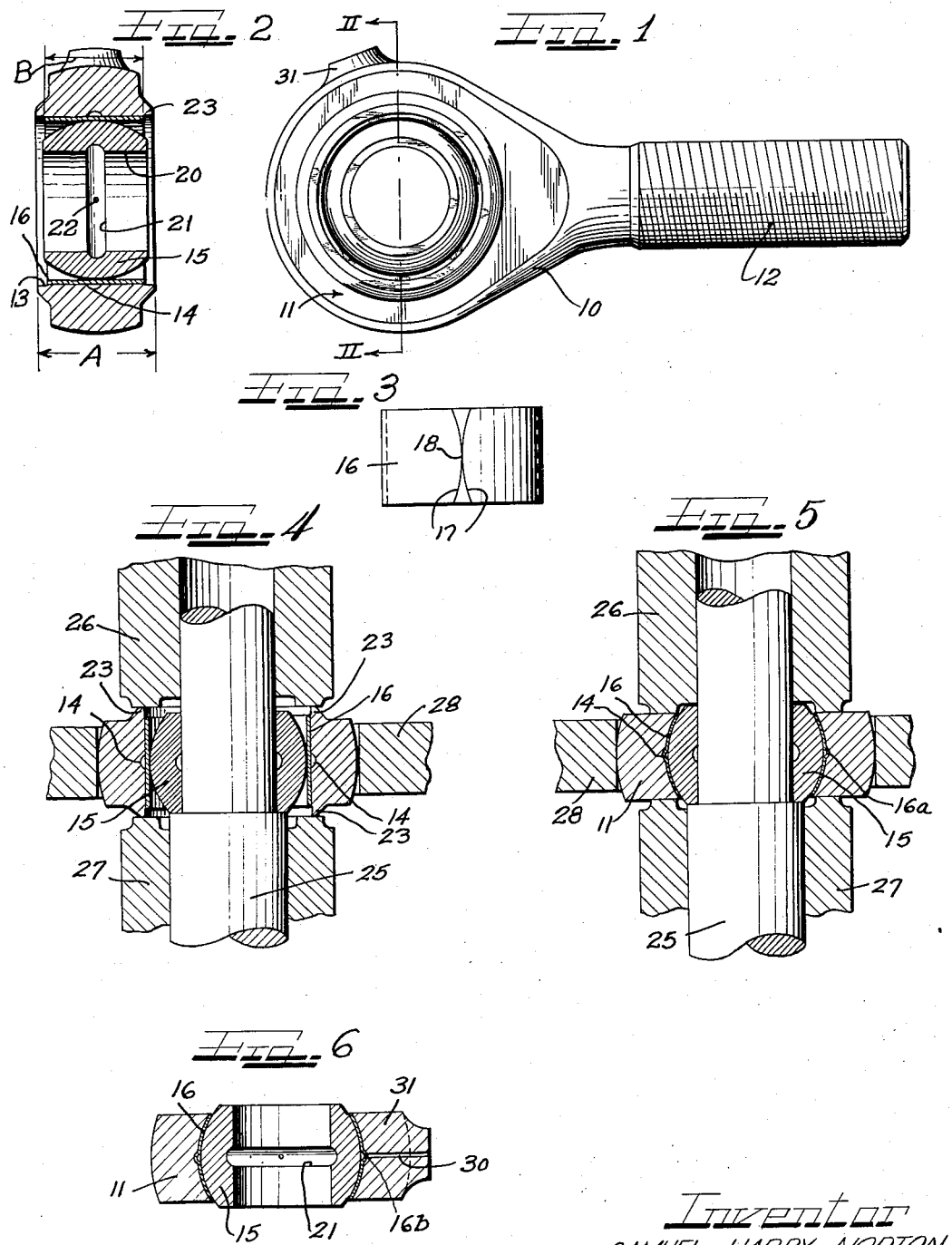
Inventor
SAMUEL HARRY NORTON

United States Patent Office 2,904,874
Patented Sept. 22, 1959

2,904,874

METHOD OF MANUFACTURING CONNECTING ROD BEARINGS

Samuel Harry Norton, University Heights, Ohio, assignor to Thompson Ramo Wooldridge Inc., a corporation of Ohio Application November 20, 1956, Serial No. 623,389

3 Claims. (Cl. 29—149.5)

The present invention relates to connecting rod structures and is, more particularly, concerned with the provision of an improved universally journaled connecting rod end having exactly controlled bearing tolerances as well as an integral oil groove and bearing liner interlock arrangement.

Connecting rods of the general type employing one or both ends with an eye having a generally spherical bearing element universally mounted therein, are known in the prior art. It has been considered essential for satisfactory bearing operation in such universal pivot connecting rod ends to provide a bronze or other bearing metal liner between the inner surface of the connecting rod eye and the spherical ball carried therein. In order to provide proper bearing action without binding and at the same time to minimize the amount of slack in the connecting rod, numerous methods have been proposed for controlling the slack or tolerance between the bearing liner member positioned in the connecting rod eye and the generally spherical surface of the ball. For example, it has been known that the liner may be swaged into contact with the ball member and subsequently shot peened or hammered to loosen it from the ball. Still another method of loosening the swaged liner from the ball member is to roll the outer peripheral surface of the liner, thereby stretching the liner somewhat.

While methods have thus been known in the prior art for providing a universal connecting rod end having a liner therein, it has been found that the above mentioned methods of manufacture do not provide a commercially satisfactory connecting rod. This is true since it is practically impossible to obtain accurate control of the tolerances. Peening of the bearing liner produces such a wide variation in the tolerance between the liner and the ball member that quality control of the product is prohibitively expensive for mass production purposes. In the prior art devices, further difficulties have been encountered in positively and permanently fixing the bearing liner to the eye of the connecting rod at the same time destroying the tolerances previously manufactured into the bearing and liner sub-combination.

In accordance with the principles of the present invention a new and greatly improved connecting rod and bearing structure is provided in which the tolerances may be exactly controlled in an inexpensive manner. Further, the permanent connection between the bearing liner and the connecting rod eye is assured without in any way effecting the tolerance between the bearing liner and the joint. This improved connecting rod is achieved through a process in which the eye of the connecting rod and the bearing liner are simultaneously swaged into contact with the spherical bearing at a time when the temperature of the spherical bearing is accurately controlled. Subsequent to the swaging operation, the bearing element is permitted to cool thereby shrinking away from the inner surface of the bearing liner an amount readily calculable and, further, readily reproduceable.

In accordance with the present invention a spherical ball member is constructed of hard material such as for example, steel. This material has a generally well recognized coefficient of expansion with temperature changes and, in the case of steel the coefficient of expansion is generally considered to be .000006 inch per inch of diameter of the heated material per degree Fahrenheit. In order to provide a final bearing clearance between the outer surface of the bearing member and a liner swaged about it, the present invention contemplates heating the ball member to a temperature approximating 500° F., or approximately 430° F. above room temperature. The bearing liner is then swaged on the ball providing a tight fit between the liner and the ball. Upon cooling of the ball, however, the surface of the ball shrinks away from the liner approximately .003 inch leaving a substantially perfect bearing fit. Since the temperature of the bearing may be accurately controlled and, further, since the amount of expansion per degree of temperature rise is such an insignificant amount, the exact tolerance desired may be achieved with an absolute minimum of difficulty. Further, the exact tolerance may be reproduced with almost absolutely exact accuracy over and over again merely by heating the bearing members to the same temperature.

In further accordance with the present invention, the bearing liner is swaged onto the outer surface of the heated ball member simultaneously with an inward swaging or deformation of the eye end of the connecting rod such that the bearing liner not only conforms to the ball member but also to the eye of the connecting rod in a permanent manner. As a result, a unified connecting rod bearing structure is provided having the desired bearing tolerances incorporated therein.

It is, accordingly, an object of the present invention to provide an accurate and substantially improved method of manufacturing a connecting rod bearing having prescribed tolerances.

Still a further object of the present invention is to provide a method of manufacturing a connecting rod having a bearing and bearing liner permanently mounted therein.

Another object of the invention is to provide a connecting rod having a bearing liner permanently installed in an eye end thereof in a manner to provide a natural oil groove between the liner and a bearing member positioned therein.

Still a further object of the present invention is to provide a universal connecting rod end bearing having an exactly controlled bearing clearance or tolerance.

Still another object of the present invention is to provide an inexpensive method of manufacturing universal connecting rod ends at rigidly controlled specifications.

Still a further object of the present invention is to provide an improved method of manufacturing universally pivotally mounted connecting rod ends by heating the connecting rod bearing prior to assembly thereof into a connecting rod eye to thereby provide a control assembly tolerance of the connecting rod eye and bearing.

Still other and further objects and features of the present invention will at once become apparent to those skilled in the art from a consideration of the attached sheet of drawings wherein a preferred embodiment of the invention is shown by way of illustration only, and wherein:

Figure 1 is a plan view of a tie rod end having a bearing member and liner therein in the positions the parts would occupy during the final assembly process;

Figure 2 is a cross sectional view taken through the connecting rod end shown in Figure 1 and taken along the line II—II;

Figure 3 is a side elevational view of the bearing liner utilized in accordance with the principles of the present invention;

Figure 4 is a cross sectional elevational view of the connecting rod end assembled in the press for final assembly, immediately prior to initiation of the assembling operation;

Figure 5 is a cross sectional elevational view of the connecting rod and fixture parts shown in Figure 4 immediately after the final assembly process; and Figure 6 is a side elevational view, in cross section, of the bearing in the connecting rod subsequent to its assembly and removal of the connecting rod from the assembling fixture.

As shown on the drawings:

As may be seen from a consideration of Figure 1, a connecting rod end 10 is provided having an eye generally indicated at 11 and a securing portion 12. The securing portion 12 is threaded for connection with a tie rod or any other suitable connecting link member. The manner of attachment of the eye portion 11 to such a tie rod or link member is, of course, immaterial to the present invention and the parts may be constructed integrally if so desired, thereby dispensing with the threads indicated at the attaching portion 12.

In constructing the eye portion 11, a generally cylindrical bore 13 is provided by a drilling or otherwise. This bore is additionally provided with an annular groove 14 for purposes to be described later. A segmental spherical ball bearing member 15 is positioned within the bore 13 and an intermediate bearing liner member 16 is positioned between the bearing 15 and the bore 13.

The bearing liner member 16 is preferably constructed of bronze or other bearing material having a low coefficient of friction and is formed in an annular or ring shape as shown in Figure 3 with its ends cut out in an arcuate shape as indicated at 17 in Figure 3. As shown in that figure the curved ends 17 contact at a midpoint 18 when the ring is in its room temperature condition, which condition will exist in the assembly of the parts 11 and 16 shown in Figure 2. In the assembly of the bearing liner 16 into the eye 11 it is intended that the fit therebetween be snug at normal room temperatures so that the forces applied subsequently in the swaging operation will be distributed evenly to the liner.

The ball member 15 is preferably constructed of a hardened material such as steel. The bearing has an external diameter in the room temperature condition, which is less than the inside diameter of the bearing liner 16 by an amount substantially equal to the desired tolerance between the bearing member 15 and the liner 16 in the final assembled operating condition. For a bearing of the type here shown such a clearance would approximate two to five thousandths of an inch. In the modification illustrated the bearing member 15 comprises an annular ring having a central bore 20 and an annular oil groove 21 having at least one radially directed oil hole 22 leading to the peripheral surface of the ball. It will be understood, however, that the ball member 15 may comprise a stud member having a sperical end surface if desired and that the bearing member 15 may be secured to a driving or driven element in a mechanical system in any manner desired without departing from the principles of the present invention.

It will be seen from a consideration of Figure 2 that the connecting rod end has an eye thickness A which is somewhat greater than the depth B of the liner 16. The depth B of the liner 16 is, in turn, somewhat greater than the desired finished or finally assembled depth thereof as will be more fully explained below.

In assembling the parts of the connecting rod together, the bearing liner 16 is first inserted into the eye 11 in the position shown in Figures 1 and 2. The bearing member 15 is then placed on a mandrel 25, where the bearing member comprises an annular ring shaped member as in the embodiment shown, and both the mandrel 25 and the bearing element thereon are heated to an elevated temperature which is sufficient to expand the bearing member to a diameter at which the fit between the external surface of the bearing member and the internal surface of the liner is snug. The heated mandrel and bearing element are then positioned within the connecting rod eye 11 as shown in Figure 4 and press ram members 26 and 27 are applied to the overhanging edges 23 of the bore 13 in the connecting rod eye. Outward expansion of the connecting rod eye 11 is prevented by means of an apertured support 28 and, accordingly, movements of the press rams 26 and 27 together forces the relatively unsupported bearing liner 16 toward the spherical outer surface of the bearing member 15. At the same time, the bearing liner 16 is axially compressed, forcing it radially outwardly at its midpoint into the annular groove 14 in the bore 13. The disposition of the metal in the connecting rod eye 11, and the liner 16 by the movement of the rams 26 and 27 is clearly seen from Figure 5 wherein the parts are shown in their final assembled condition. At this point in the process the mandrel 25 is withdrawn from the bearing member 15, the connecting rod is removed from the support 28 and the assembled unit is permitted to cool. The cooling permits the bearing member 15 to shrink back to its room temperature dimensions thereby automatically providing the tolerance of approximately two to five thousandths of an inch originally present in the parts prior to the assembly operation.

It will be seen from the above that by the method thus described, a satisfactory tolerance may easily be achieved between the bearing liner 16 and the bearing member 15. Further, as a result of the process above set forth, the liner 16 is deformed into a segmental spherical shape having an annular rib 16a which interlocks with the groove 14 in the connecting rod eye in a manner positively preventing any movement between the eye and the liner. The liners thus positively located relative to the assembly and its inadvertent slipping out of position, which might otherwise occur in a spherical joint, is prevented in a positive and yet simple manner.

Subsequent to the assembly of the elements as above set forth, an oil hole 30 may be drilled in the upstanding projection 31. This drilling operation preferably takes place subsequent to the assembly operation in order to assure exact alignment of the oil hole 30 with the hole drilled through the liner 16 as at 16b. By drilling the hole 30 subsequent to the assembly operation the hole 16b is drilled as an extension thereof and positive circulation is then assured.

As mentioned above in the general discussion of the present invention, the exact amount of heat employed in expanding the bearing member 15 may readily be computed and may be maintained to constant or repeated assembly operations. Where a steel ball or bearing member 15 is utilized, a coefficient of thermal expansion is approximately .000006 inch per inch of diameter of the bearing member. Accordingly, the elevated temperature to which the bearing member 15 must be heated may readily be determined from the following formula:

$$(T_1 - T_2) \cdot .000006 \, D = C$$

or, as rephrased, solving for $T_1$ $$T_1 = \frac{\frac{C}{D} + .000006 \, T_2}{.000006}$$

where:

$T_1$ = Temperature in degrees Fahrenheit and
$T_2$ = Room temperature or design operating temperature of the parts.
$D$ = Diameter of the bearing member 15, in inches.
$C$ = The clearance or tolerance desired, in inches.

Thus, for example, if the bearing member 15 has a design outer diameter of one inch and a tolerance between it and the inner surface of the liner 16, .0025 inch is desired, and where the room or operating temperature is 75° F., the elevated temperature $T_1$ would be essentially 500° F. By modifying the elevated temperature $T_1$ the tolerance may be readily controlled. It will be appreciated, of course, that the swaging or pressing of the connecting rod eye 11 as shown in Figures 4 and 5 must be accomplished very rapidly in order to prevent the parts from cooling during the assembling process and thereby effecting the tolerances. It may be desired in actual practice to overheat the bearing member 15 slightly depending upon the time consumed during the swaging operation. This additional elevation of temperature would depend on the time consumed, and the heat transfer conditions existing during the operation and would, of course, be empirical to the given assembly apparatus. Accordingly, the additional temperature could be added to the computation above set forth for any given installation, and the tolerances varied merely by adding or decreasing this basic figure in the manner above discussed.

Since the temperatures may be varied at will and very accurately, and since a moderate change in temperature would result in only a very slight change in the tolerance achieved, an extremely accurate control of the tolerance results from utilization from the present process. This is in direct contradistinction to heretofore known processes employing subsequent peening or rolling of the bearing liner after initial assembly to the bearing member 15. Such systems provide a practically uncontrollable tolerance and the percentage of rejects under such systems greatly increase the cost of manufacture.

It will thus be seen that I have provided a novel and substantially improved connecting rod having a substantially perfectly controlled tolerance between the connecting rod eye and the generally spherical bearing member positioned therein. In accordance with the present invention a bearing liner utilized between the connecting rod eye and the bearing member is positively locked in position, and, at the same time, a satisfactory oil groove is provided therein for the circulation of oil, grease or other lubricant. It will, of course, be understood that the bearing liner 16 may be eliminated, where desired, without departing from the concepts of the present invention although the efficiency of the bearing surface may be thereby impaired through the elimination of the ordinarily more desirable bearing characteristics of the liner. Still other and further variations in construction may be utilized, and will be apparent to those skilled in the art, without departing from the scope of the novel concepts of the present invention, and, accordingly, it is my intention that the scope of the invention be limited solely by that of the hereinafter appended claims.

I claim as my invention:

1. The method of making a connecting rod end for a generally spherical bearing comprising the steps of forming a cylindrical bore in said end with a diameter greater than said bearing, forming a generally cylindrical liner of thin bearing material with a depth slightly greater than the desired finished depth of the connecting rod end and an inside diameter greater than the diameter of said bearing, snugly positioning said liner in said bore, heating said bearing to expand it to a diameter larger than its normal diameter by an amount at least as great as the desired final difference in diameter between the bearing and the bearing liner, positioning said heated bearing in said bore and forcing by pressing or swaging said liner and said eye to conform said eye and said liner to said spherical bearing, and cooling said assembled bearing and connecting rod end to shrink said bearing to its normal size away from contact with said liner.

2. The method of making a connecting rod end for a generally spherical bearing comprising the steps of forming a cylindrical bore in said end with a diameter greater than said bearing, forming a generally cylindrical liner of thin bearing material with a depth slightly greater than the desired finished depth of the connecting rod end and an inside diameter greater than the diameter of said bearing, snugly positioning said liner in said bore, heating said bearing to expand it to a diameter larger than its normal diameter by an amount at least as great as the desired final difference in diameter between the bearing and the bearing liner, positioning said heated bearing in said bore and pressing or swaging said liner and said eye axially of said bore to conform said eye and said liner to said spherical bearing, and cooling said assembled bearing and connecting rod end to shrink said bearing to its normal size away from contact with said liner.

3. The method of making a connecting rod end for a generally spherical bearing comprising the steps of forming a cylindrical bore in said end having a diameter greater than said bearing, forming an annular groove in said bore axially midway thereof, forming a generally cylindrical liner of thin bearing material with a depth slightly greater than the desired finished depth of said connecting rod end and an inside diameter greater than the diameter of said bearing, snugly positioning said liner in said bore, heating said bearing to expand it to a diameter larger than its normal diameter by an amount at least as great as the difference in finished diameters desired between the bearing and liner, positioning said heated bearing in said bore and axially pressing or swaging said connecting rod end and bearing to simultaneously conform the inner surface of the bearing liner to the spherical surface of the bearing member and outwardly deform the axial midpoint of the liner into said annular groove in said bore.

References Cited in the file of this patent

UNITED STATES PATENTS

| | | |
|---|---|---|
| 2,675,279 | Heim | Apr. 13, 1954 |
| 2,681,259 | White | June 15, 1954 |
| 2,728,975 | Potter | Jan. 3, 1956 |
| 2,738,570 | Heim | Mar. 20, 1956 |
| 2,787,048 | Heim | Apr. 2, 1957 |